Patented June 5, 1934

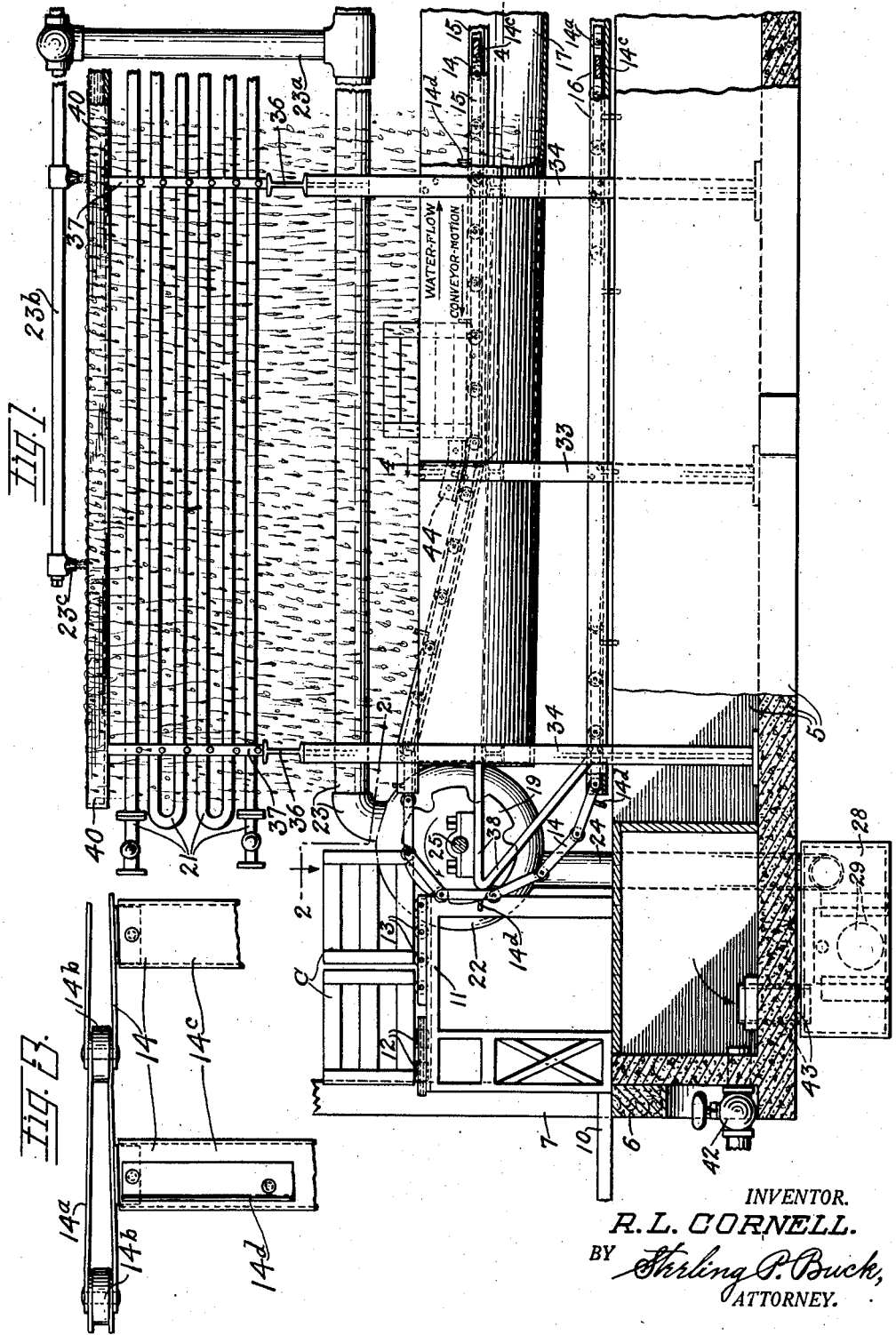

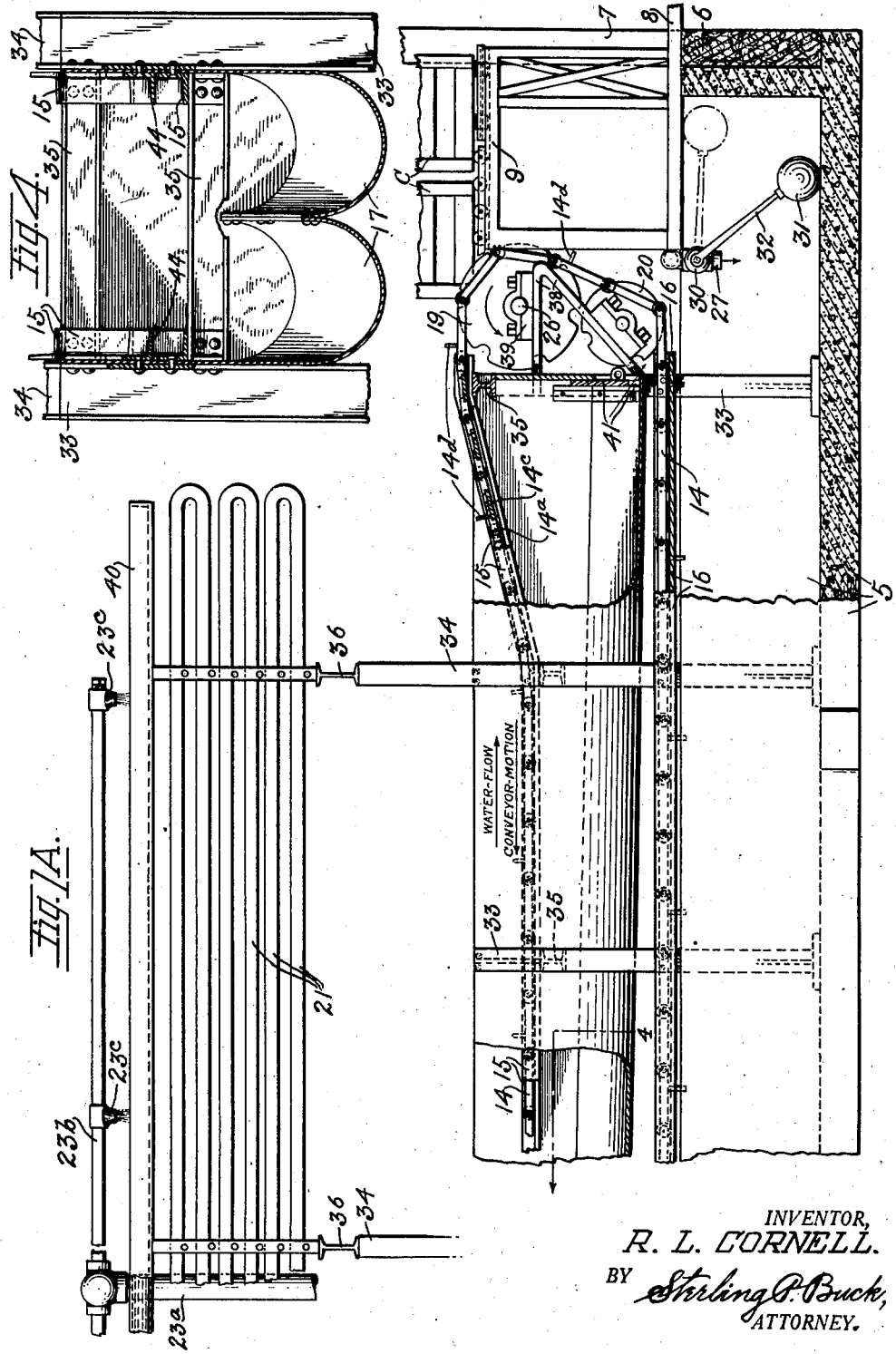

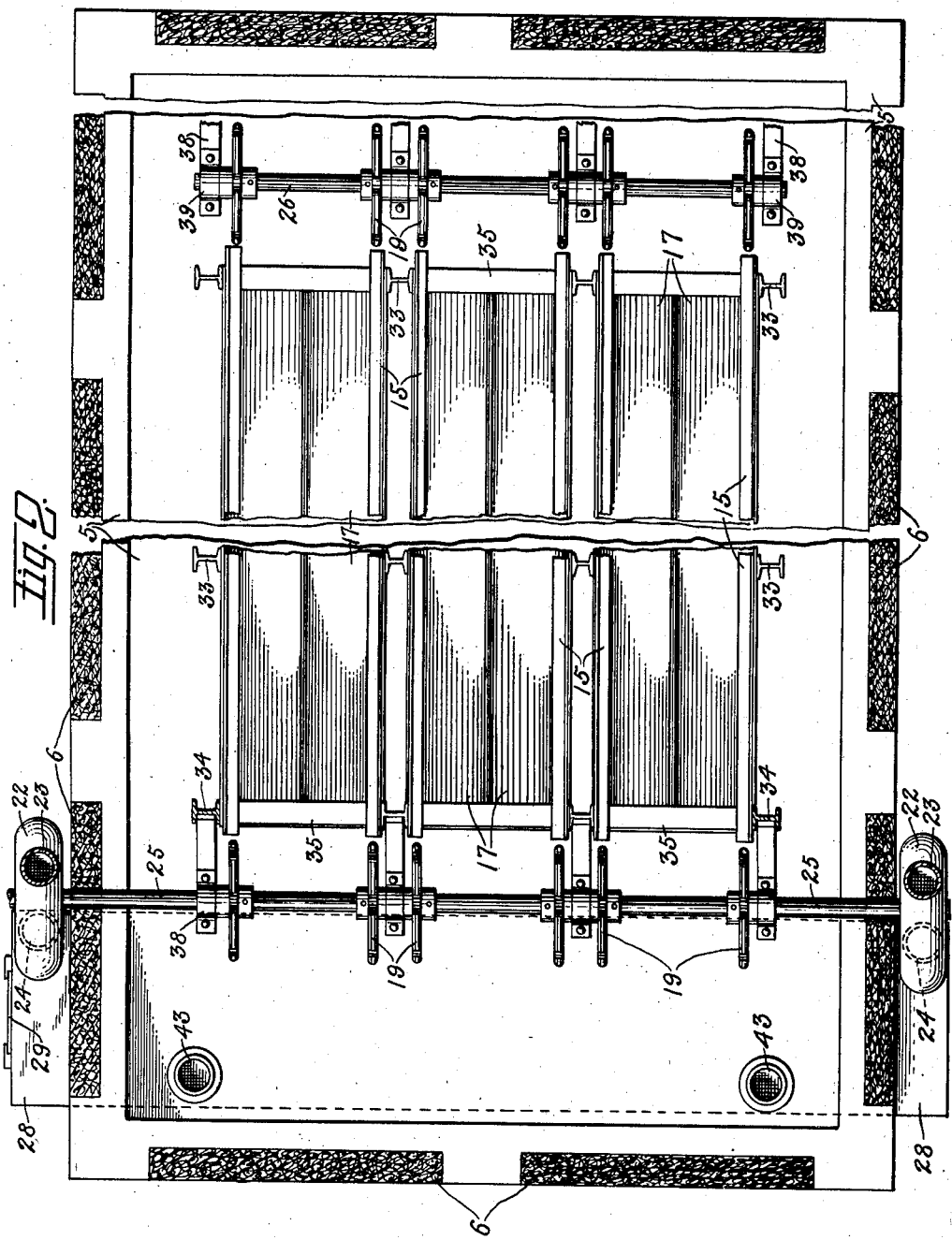

1,961,337

UNITED STATES PATENT OFFICE 1,961,337

VEGETABLE-CONDITIONING METHOD AND MACHINE

Robert L. Cornell, Sanford, Fla.

Application June 5, 1933, Serial No. 674,429

3 Claims. (Cl. 62—104)

This invention relates to vegetable-conditioning methods and machines, and more specifically, it relates to a method and mechanical means for washing and pre-cooling vegetables immediately before they are stored for shipment in cars for delivery to the places of distribution and sale. By thus conditioning the vegetables (including fruits), the combined cooling and washing frees the vegetables from dirt, insects and other foreign substances, while reducing the heat therein to a low degree, thereby not only improving the quality of the vegetables, but also reducing or eliminating the cost of re-icing or re-refrigerating the cars enroute. Of course the same applies to shipment by boats and other means of transportation.

One object of the invention is to so improve upon machines of this nature as to very greatly reduce the first cost of conditioning vegetables for transportation to the markets.

Another object is to greatly increase the rapidity of removing the heat from the vegetables, thereby maximizing the output of pre-cooled and washed vegetables.

Another object is to provide this machine with very effective and efficient means to continually remove sand and silt from the conditioning sluices so as to avoid an accumulation of such detrimental or contaminating materials therein.

Another object is to provide a very effective and efficient means to force crates of vegetables through and counter to a current or currents of cooling and washing water while the current is maintained by refrigerated water which showers upon the vegetables so as to wash and pre-cool the unsubmerged parts of the vegetables as well as the parts that are submerged in the sluice or sluices.

Another object is to provide conveyors in the respective sluices, and operating longitudinally therearound, for carrying the crates of vegetables into and through and out of the sluices, and to provide each sluice with an adjustable outlet-gate for maintaining the proper depth of water for floating or substantially floating the crates, thereby avoiding obstruction to the circulation of water through the bottoms of the crates, and minimizing the load on the conveyor so as to minimize the wear and the necessary power for operating the conveyor.

Another object is to provide an overflow-tank under the several sluices to receive the water from the sluices and the unused water from the refrigerating tubes, in combination with one or more circulating pumps and pipes for carrying the water back from the overflow-tank or settling-tank to the refrigerating coils, and in combination with means to strain or filter the water enroute from the settling-tank to the refrigerating coils.

Another object is to provide an effective and efficient means to drive a number of vegetable-carrying conveyors at slow speed so they will keep the vegetables in the cooling water long enough to sufficiently pre-cool them without repetition of the cooling process relative to the specific crates of vegetables, and to provide each conveyor with pushers to force the floating crates along against the sluice-currents of water, the pushers of each conveyor being in staggered relation to those of the other conveyors so as to deliver the crates one at a time for permitting the operators to easily direct them (one at a time) to the chute or conveyor (not shown) that delivers them to the car, hold, or container in which they are to be transported to market.

Another object is to provide twin sluices which are practically free from rivets or other impediments to the free and swift flow of water at their inclined bottoms, which bottoms are concaved in cross-section so that the sand and silt from the vegetables gravitate to the central-lower parts of each twin-sluice and are carried out continually through the sluice-gates at the low ends of each sluice-bottom.

Another object is to provide effective heat-insulating walls around the washing and cooling devices so as as to maintain the low temperature thereof against the heating tendency of the outer atmosphere.

Other objects and important features are pointed out or implied in the following details of description, in connection with the accompanying drawings in which:

Fig. 1 is a view, partly in side elevation and partly in section, showing the delivering end of a pre-cooling and washing apparatus constructed according to my invention, crates in different positions, and representation of water flowing down on and over the refrigerating pipes or tubes onto the crate-carrying conveyors in and around the twin-sluices, this view being substantially complemental to Fig. 1A.

Fig. 1A is a view, partly in side elevation and partly in section, showing the feeding or receiving end of the apparatus, the direction of motion of the driving shaft and sprockets being shown by the curved arrow, the direction of travel of the conveyor and of the water in the sluices being indicated by appropriate words and by oppositely pointing horizontal arrows, and the outflow of water through the partly open sluice-gate being indicated by the oblique arrow, while the vertical arrow indicates the inflow of the external supply of water, this figure being complemental to Fig. 1.

Fig. 2 is a plan view of front, rear and intermediate parts of the settling tank, of the twin-sluices and conveyor tracks and their supporting uprights or I-beams, some of the latter being in section at the line 2—2 of Fig. 1 where the sections of the outlet-pipes of the pumps are also shown, certain intermediate parts being broken out and omitted because they are duplicates of parts illustrated, the conveyors being omitted for more clearly showing the sprockets and tracks which carry them.

Fig. 3 is an enlarged fragmental detail view of one of the endless conveyors. It is to be understood that there is one of these conveyors for each twin-sluice shown in Figs. 1, 1A and 2.

Fig. 4 is an enlarged detail cross-sectional view taken where indicated by the line 4—4 and by the arrow-heads in the complemental Figs. 1 and 1A, the lower-middle part of one of the cross-beams being broken out to prevent hiding the upper end of the partition between the sluices of the twin-sluice here illustrated.

Referring to these drawings in detail, in which similar reference numerals refer to similar parts in the several views, the invention is described in detail as follows:

The settling tank 5 is preferably a monolithic structure of concrete which may be reinforced or not, and is substantially a trough, being relatively shallow and long and as wide as may be desirable for containing one or a number of conditioning units such as presently described. Insulating walls 6 may surround or nearly surround the wall of the settling tank and extend to any desired height and be provided with doorways 7 through which the crated vegetables can be fed onto and removed from the respective conveyors. These doorways may be wide enough to admit of access to two or more of the conveyors through each doorway. An operator's platform 8 and table 9 may be provided for each conveyor, or each platform and table may be wide enough to accommodate several of the conveyors; the same being true with respect to a similar platform 10 and table 11; the distinctions being that the parts 8 and 9 are at the feeding end, while the parts 10 and 11 are at the delivering end. Each table is preferably provided with rollers 12 and 13 to facilitate easily and quickly feeding the crates C onto the conveyors 14, and for easy and quick removal thereof at the delivery end.

Each conditioning unit includes one of the conveyors 14, the track-rails 15 and 16 which carry the respective upper and lower sections of the conveyor, the twin-sluices 17 that carry the track-rails therein, the pairs of sprockets 18 and 19 that combine with the track-rails in carrying the conveyors, the guiding sprockets or wheels 20 (Fig. 1A), and a set of refrigerating pipes or tubes 21, in combination with the parts that support and secure them in proper relation to one another, and in combination with means to distribute water over the refrigerating pipes and thereby cool the water immediately before it falls onto the crated vegetables. These conditioning units are combined with one another by means of their mutual supporting frame or structure within their mutual settling tank, by their mutual circulating pump or pumps 22 and pipes 23 and 24, and by their mutual driving and carrying shafts 25 and 26, as well as by their mutual water supply pipe 27 and water-filter 28, the latter being of any appropriate form and preferably having a normally closed gate or manhole 29 through which it may be cleaned and re-packed. The water-supply pipe 27 is provided with a valve 30 connected to a float 31 by means of an arm 32, and by this means (when the float is in the broken line position) the flow of water from the pipe 27 is cut off whenever the water-level reaches a predetermined position in the settling tank, so the depth is thereby maintained at a predetermined normal.

The supporting structure includes uprights or I-beams 33 and 34, horizontal cross-beams 35 within the twin-sluices, horizontal beams 36 spanning the spaces between the uprights 34, racks 37 on the beams 36 and supporting the refrigerating coils or pipes 21, and bearing-hangers or brackets 38 which support the journal-bearings 39 of the shafts 25 and 26; these brackets being secured to uprights 34 by welding or other appropriate means not shown.

Distributing troughs or channels 40 are supported on the brackets 37 in proper position and relation to overflow all along their respective walls and to thus distribute water over and on the refrigerating pipes, the latter being over the respective twin-sluices so as to deliver cooled water into the latter and onto the crated vegetables therein. The cooled water immediately gravitates from the vegetables while absorbing heat from the latter and while giving place to more of the cooled water which continues to fall on the vegetables as they are carried along by means of the conveyors in the direction of "Conveyor-motion" (as shown in Figures 1 and 1A) and counter to the direction of "Water-flow" (Figs. 1 and 1A). The flow of water in the sluices is effected by the inclination of the sluice-bottoms towards the sluice-gate or gates 41, and by the outpour or water through the sluice-gates. The vegetables moving through the water, in the upper part of the sluices, counter to the water-flow, force the water through the masses of vegetables in the crates and thereby accelerate the process of cooling and washing; this motion tending to retard the flow at the upper part and to thereby accelerate the flow at the lower part of each sluice, just as the inflowing ocean tides cause the outflowing undertow, and this current along the inclined bottom of each sluice keeps it free from accumulated sand and silt that pass out from the sluice-gate into the settling chamber or tank 5 whence they may be removed by any appropriate means without draining the settling tank. However, if and when it is desired to drain the settling tank, a valve or gate 42 (Fig. 1) may be opened for that purpose; or it may be drained by the circulating pump or pumps and other appropriate means if the valve-arm 32 is held up while the machine is operating, for the vegetables will eventually carry away the water in the absence of a continual replenishment.

An outlet tube 43 connects the tank 5 in open communication with the filter or strainer 28, so the water from the tank 5 flows into the filter or strainer whence it is pumped through one or more pipes 24 by one or more pumps 22 into one or more pipes 23. Each pipe 23 has one or more branches 23a which extend up and have sub-branches 23b that extend longitudinally over the respective distributing troughs 40 and have nozzles 23c for returning the once-used water (which is relatively cool) to the distributing troughs and thence to the refrigerating pipes to be re-cooled to a lower degree immediately before being again used on the vegetables for conditioning or preparing them for shipment. Cross-pipes (not shown) may connect the upright pipes 23a with several pairs of nozzle-carrying pipes 23b so that all the distributing troughs are fed simultaneously by the same circulating pump or connected pair of pumps 22.

The terminals of the respective refrigerating pipes 21 are connected to the usual refrigerant circulating means in the usual or any proper way, so that they are properly termed cooling pipes or refrigerating pipes or water-cooling means.

Each conveyor 14 comprises chains 14a, rollers 14b, cross-beams 14c and upright pushers 14d. The rollers roll on the track-rails 15 which are L-beams or angle-beams riveted or otherwise secured to the walls of the twin-sluices and are substantially level at their intermediate major parts and inclined at their end parts so that the vegetable crates quickly descend thereon into the water in the sluices, remain a relatively long time in the cooled stream of water and under the down-pouring water, then ascend to the discharge-end where they are directed to the transportation vehicle. To prevent the pull of the sprockets 19 (on the shaft 25) from lifting the chains or conveyors from the track-rails 15, guiding flanges 44 are suitably secured and spaced above the respective rails as shown in Figs. 1 and 4. The idlers 20 prevent the lower section of the respective conveyors from lifting from the lower track-rails 16. The pushers 14d are spaced far enough from one another to admit the largest size of vegetable crates to be placed therebetween, and when the crated vegetables are floating above the cross-beams 14c, these pushers propel them through the water counter to the direction of flow in the sluices, thereby attaining the object ascribed to this feature.

Each sluice of a pair has a high outer wall and a low inner wall, and the pair of low inner walls are curved upward extensions of the sluice-bottoms; their upper edges are riveted or otherwise secured to one another; and this combination provides a partition between the twin-sluices and rigidifies the structure so it sustains the weight of the water therein, notwithstanding that these sluices are formed of thin sheet metal such as galvanized iron.

Although the apparatus would give useful results if no longer than indicated by the combined Figs. 1 and 1A, it may be any desired length, preferably long enough to accommodate a considerable number of vegetable crates on each conveyor at the same time, so the invention is not limited as to dimensions, proportions, number of conditioning units, nor to materials of which the different parts are formed, nor to any particular form of means to drive the main driving shaft 25 which may be properly considered as driving means for the other devices which are movable to perform their functions, nor to any of the specific details as described and shown in the foregoing, for the invention is susceptible of numerous changes within the scope of the inventive ideas as implied and claimed in the following:

What I claim is:

1. The method of washing and cooling food materials, consisting in causing the food materials to float in a flowing body of cool water while in contact with the water and counter to the direction of flow of the water while a part of the food materials protrude above the water, causing precooled water to shower the protruding parts of the food materials and to pass thence down into said flowing body for adding thereto and causing it to continue to flow, trapping a part of the water that has washed and cooled the food materials, elevating and re-cooling a part of the trapped water, and re-showering the food materials with the re-cooled water while the food materials remain in said body of cool water.

2. In an apparatus for washing and cooling crated materials, the combination of a sluice, refrigerating pipes over the sluice and extending therealong, a receptacle over and extending along said refrigerating pipes and effective to continually receive water and distribute it over said refrigerating pipes to be cooled by the latter and to pour down into said sluice for maintaining a body of water in said sluice, a track in said sluice and extending therealong from end to end and having upwardly and outwardly inclined ends within said sluice, a conveyor mounted to travel on said track and to carry the crated materials, the intermediate part of said track between said inclined ends being below the top of the sluice at a proper elevation to permit a part of said crated materials on said conveyor to be submerged while another part of the materials on the conveyor protrudes above the water in the sluice so as to receive the down-pouring cooled water from the refrigerating pipes, and means to move said conveyor along said tracks and thereby effect a flow of water horizontally through each crate of materials on said conveyor so as to expedite the cleaning and cooling of the said materials.

3. The combination defined by claim 2, a receptacle under said outlet to receive relatively cool water from said outlet, and means to carry the relatively cool water from the last-said receptacle and deliver it to the receptacle over the refrigerating pipes for distribution over the latter for being re-cooled to a lower degree and repoured on said materials.

ROBERT L. CORNELL.